US007088361B2

(12) United States Patent
Boekhorst

(10) Patent No.: US 7,088,361 B2
(45) Date of Patent: Aug. 8, 2006

(54) RAYCASTING PERSPECTIVE VIEWS

(75) Inventor: Martijn Boekhorst, Nieuwegein (NL)

(73) Assignee: International Business Machines Corporation, Armonk, NY (US)

(*) Notice: Subject to any disclaimer, the term of this patent is extended or adjusted under 35 U.S.C. 154(b) by 273 days.

(21) Appl. No.: 10/844,027

(22) Filed: May 11, 2004

(65) Prior Publication Data
US 2004/0227753 A1    Nov. 18, 2004

(30) Foreign Application Priority Data
May 14, 2003    (GB)    .................... 0311048.3

(51) Int. Cl.
G06T 15/20    (2006.01)
(52) U.S. Cl. ..................... 345/421; 345/443
(58) Field of Classification Search ............. 345/424
See application file for complete search history.

(56) References Cited

U.S. PATENT DOCUMENTS 5,442,733 A * 8/1995 Kaufman et al. ......... 345/424
6,529,196 B1 * 3/2003 Holt ........................ 345/443

OTHER PUBLICATIONS

L. Szirmay, "Theory of Three Dimensional Computer Graphics", Chapter 2, pp. 25-52.
A. Fujimoto et al., ARTS: Accelerated Ray-Tracing System, IEEE CG&A, Apr. 1986, pp. 16-26.
Amanatides, John and Woo, Andrew, "A Fast Voxel Traversal Algorithm for Ray Tracing", Eurographics '87, 1987.

* cited by examiner

Primary Examiner—Mark Zimmerman
Assistant Examiner—Andrew Yang
(74) Attorney, Agent, or Firm—John Pivnichny

(57) ABSTRACT

A method, an apparatus, and a computer program product are disclosed for rendering a digital image using raytracing in a three-dimensional space. A 3-D digital differential analyzer (DDA) denominator vector describes a size condition for stepping to a next cell. Variables of the denominator vector are setup for a first sample of a first horizontal line of samples. A ray is cast into the 3-D space for a current sample dependent upon the denominator vector. An updated value of the denominator vector for next sample is generated. First and second order differentials for the sample in the horizontal line of samples are incrementally computed using only additions. In this manner, a ray is cast for each sample in the line of samples. Another updated value for the denominator vector for next line of samples is generated. First and second order differentials for the vertical axis are incrementally computed using only additions. In this manner, every line of samples is processed.

34 Claims, 3 Drawing Sheets

RAYCASTING PERSPECTIVE VIEWS

TECHNICAL FIELD

The present invention relates generally to computer graphics and, in particular, to methods and engines for rendering a digital image using raytracing.

BACKGROUND OF THE INVENTION

Raytracing is a field of computer graphics that can produce superior, photorealistic digital images. Raytracing or ray-casting is a three-dimensional (3-D) rendering technique that determines the location of an object in 3-D and calculates shadows, reflections, and hidden surfaces based on lighting conditions and locations, as well as material characteristics. The visibility of surfaces is determined by tracing rays of light from the viewer's vantage to objects in a scene.

Raytracing differs from z-buffer oriented methods by being ray centric, as opposed to primitive centric. Instead of drawing primitives to a screen, rays are cast from a virtual eye, or center of projection, through screen pixels (i.e., a view plane) to find intersecting primitives for those pixels. Each pixel has a color set to that of the primitive at the closest point of intersection. While raytracing has existed for quite some time, only recently has research started to make raytracing algorithms run in realtime. Current applications for raytracing include movie and advertising business for precalculated visualisations.

Interactive and realtime raytracing are closely related areas, but are not quite the same. "Interactive" refers to the ability to compute scenes at realtime speeds, without prior knowledge of future frames (e.g., a user may be able to control scene content directly). "Realtime" refers to the ability to compute scenes at speeds sufficiently high to convey the perception of motion to the human eye and allowing an algorithm with knowledge of future frames (more of a prescripted movie approach to animation).

A major limitation on the application of raytracing is the significant computational requirements incurred to render images. A number of proposals have been made to increase the efficiency of raytracing to expand its use in computer graphics. A number of algorithms and architectures for image generation are described by Szirmay-Kalos, László, *Theory of Three Dimensional Computer Graphics*, Chp. 2, pp. 25–52. In particular, Szirmay-Kalos describes a Digital Differential Analyzer (DDA) line generator used to generate pixel data by applying an incremental concept to scan-line conversion. For a linear function, a line can be drawn using the DDA that eliminates multiplication, non-integer addition, and round operations. The slope of a line is calculated once and is then used to incrementally determine or generate the line.

Fujimoto, A., Tanaka, T., and Iwata, K., "ARTS: Accelerated Ray-Tracing System", IEEE CG&A, April 1986, pp. 16–26 describe a three-dimensional digital differential analyzer (3DDDA) that seeks to address issues of speed and aliasing in ray-tracing. The 3DDDA is a 3D line generator for traversing a data structure describing a 3-D environment to identify the intersections between rays and objects in the image to be generated. The 3DDDA identifies cells pierced by a ray or straight line and generates the coordinates of the cells. One implementation of a 3DDDA is to use two DDAs synchronized to work in mutually perpendicular planes that intersect along a driving axis DA (i.e., a coordinate axis). In each plane, the respective DDA follows the projection of the 3-D line onto that plane. The coordinate corresponding to the driving axis DA of each DDA is unconditionally incremented by one unit, where the DA is determined by the slope of the line. A control term (or error term) for each DDA measured perpendicular to the DA is updated; this is done by subtracting from the control term the slope value and determining if it satisfies a stipulated condition. Both control terms are measured against the same DDA. If the test fails, a unit increment or decrement of the coordinate perpendicular to the DA is performed for the DDA. The control term is corrected by adding the value corresponding to one pixel whenever underflow occurs.

Setting up the rays cast from a viewpoint into a 3D scene representation is implemented conventionally as depicted in FIG. 1. To raytrace a three-dimensional (3D) image, for each pixel, one or more rays are typically cast from the viewpoint through the screen into the 3D world. Rays are shot through pixels in the viewport. As shown in FIG. 1, such a viewport 100 is considered a perspective correct viewport if the screen surface is planar, where:

P=Viewpoint in 3D world, or base vector,
T=T is the vector from P to the top left corner of the screen,
H=Vector representing 2D horizontal scanline in 3D world, and
V=Vector representing 2D vertical screen in 3D world.

H is the vector from the top left corner of the screen to the top right corner of the screen, and V is the vector from the top left corner of the screen to the bottom left corner of the screen.

From T, H, V and P, a planar region is formed that maps to the screenspace coordinates such that a ray cast from P to this plane corresponds to a pixel on the screen provided the ray intersects the planar region mentioned.

To form the rays for all pixels on the screen, pseudo-code such as that shown in Table 1 may be used.

TABLE 1

```
Let vector R be T
Let vector Hstep be H / (horiz-res)
Let vector Vstep be V / (vert-res)
for all y, 0 to vert-res
    Let vector S be R
    for all x, 0 to horiz-res
        Cast-ray S
        S = S + Hstep
    end for
    R = R + Vstep
end for
```

In Table 1, the vector R is initialised to the vector T. The term "horiz-res" in Table 1 represents the horizontal sampling resolution on the screen, and the term "vert-res" represents the vertical sampling resolution on the screen. Hstep and Vstep are the horizontal and vertical incremental steps, respectively. The pseudocode operates on a horizontal scanline beginning with the topmost one, and then processes each horizontal scanline moving down by one vertical step. This is done iteratively. For each scanline, the vector S is initialised. Raycasting ("Cast-ray") is performed for S, before S is incremented by Hstep, which steps are iteratively carried out until the horizontal resolution (horiz-res) is reached. "Cast-ray" casts the ray S from P into the 3D geometry to perform raytracing and determine the color of the pixel (x, y) of the screen. The vector R is then incremented by Vstep. This processing continues iteratively until the vertical resolution is reached (vert-res).

The above pseudo code is a generalization. Additional considerations such as anti-aliasing, object and viewpoint transformations, distributed raytracing (the introduction of time-based jittered variations in aforementioned transformations) or other techniques not specifically mentioned may influence the actual implementation.

The "Cast-ray" operation takes the ray, and in anything other than a non-representative, simplistic, un-optimized raytracer, prepares the ray for traversal of a spatial subdivision structure. The spatial subdivision structure may include a binary space-partitioning tree (bsp-tree), an octree, a grid, or a nested grid. Other spatial subdivision techniques may be practiced. For the "Cast-ray" operation, the initialization of variables required for traversing the spatial subdivision structure is computationally intensive. The initialization involves computationally expensive operations including multiplications and in particular divisions for each ray. Even for a low-resolution image, this cost is significant. For example, a low sampling resolution of 1024*768 results in 786,432 rays being cast, each ray requiring 3 divisions for initialization. This results in 2,359,296 divisions per frame. Clearly, improvement is required to reduce computational cost in a software implementation, and both gate-count and complexity in a hardware implementation.

Thus, a need clearly exists for an improved method of ray-tracing using a multi-dimensional DDA that reduces computational complexity and time for cast rays.

OBJECTS AND SUMMARY OF THE INVENTION

In accordance with a first aspect of the invention, there is provided a method of rendering a digital image using raytracing in a three-dimensional (3-D) space. A 3-D digital differential analyser (DDA) numerator vector holds the progress within a cell and a 3-D DDA denominator vector describes a size condition for stepping to a next cell. A denominator vector for a first sample of a first horizontal line of samples is set up.

The method further comprises the steps of:
(a) casting a ray into the 3-D space for a current sample of the horizontal line of samples dependent upon the denominator vector;
(b) generating an updated value of the denominator vector for a next sample of the horizontal line of samples;
(c) incrementally computing first and second order differential vectors for the sample in the horizontal line of samples using only additions; and
(d) repeatedly carrying out steps (a) to (c) until raycasting for the entire horizontal line of samples is completed;
(e) generating another updated value of the denominator vector for a next line of samples;
(f) incrementally computing first and second order differential vectors for the vertical axis using only additions; and
(g) repeatedly carrying out steps (a) to (f) until raycasting for the entire vertical axis is completed.

The casting step (a) may be implemented by a 3-D digital differential analyzer (DDA).

The generating step (b) may comprise: summing a current value of the denominator vector and the first order differential vector for the current sample in the horizontal line of samples to provide the updated value of the denominator vector for the next sample; and summing a current value of the first order differential vector and the second order differential vector for the current sample in the horizontal line of samples to provide an updated value of the first order differential vector.

A direction for the next ray for casting is computed dependent upon a current direction of the ray and dependent upon a horizontal resolution of the horizontal line of samples.

The generating step (e) may comprise: summing a current value of the denominator vector and the first order differential vector for the current sample for the vertical axis to provide the updated value of the denominator vector for a first sample of the next line of samples; and summing a current value of the first order differential vector and the second order differential vector for the current sample for the vertical axis to provide an updated value of the first order differential vector.

The generating step (e) may further comprise: summing a current value of the first order differential vector for the current sample in the horizontal line of samples and a differential vector of the horizontal differential across vertical line of samples to provide an updated value of the first order differential vector for the current sample in the horizontal line of samples.

A direction for the next ray for casting is computed dependent upon a current direction of the ray and dependent upon a vertical resolution of the vertical screen.

In accordance with further aspects of the invention, an apparatus and a computer program product are provided that implement the foregoing method. Further aspects of the invention are set forth in detail hereinafter.

BRIEF DESCRIPTION OF THE DRAWINGS

The invention will now be described by way of example only, with reference to the accompanying drawings, in which.

DETAILED DESCRIPTION OF THE INVENTION

A method, an apparatus, and a computer program product are disclosed for ray-casting perspective views. In the following description, numerous specific details, including programming languages, screen resolutions, number of samples per pixel, hardware description languages, are set forth. However, from this disclosure, it will be apparent to those skilled in the art that modifications and/or substitutions may be made without departing from the scope and spirit of the invention. In other circumstances, specific details may be omitted so as not to obscure the invention.

In the embodiments of the invention, raycasting perspective views is performed in a manner that reduces computational complexity. Within the field of graphics, digital differential analyzers (DDAs) are commonly used to step through regularly spaced grids of data. A DDA can be any one of a number of algorithms that are used for analysis to model how to calculate successive points by adding to axis components (e.g., for the 2-D case, adding to the X or Y components). Notable applications include anti-aliasing line drawing algorithms (beyond Bresenham) in 2D and grid-based raytracing/raycasting in 3D. The algorithms may be used to draw lines, circles, ellipses, to name but a few applications.

The method for ray-casting perspective views in accordance with the embodiments of the invention may be implemented in modules. A module, and in particular its functionality, can be implemented in either hardware or software. In the software sense, a module is a process, program, or portion thereof that usually performs a particular function or related functions. Such software may be implemented in C, C++, ADA, Fortran, for example, but may be implemented in any of a number of other programming languages/systems, or combinations thereof. In the hardware sense, a module is a functional hardware unit designed for use with other components or modules. For example, a module may be implemented using discrete electronic components, or it can form a portion of an entire electronic circuit such as a Field Programmable Gate Arrays (FPGA), Application Specific Integrated Circuit (ASIC), and the like. A physical implementation may also include configuration data for a FPGA, or a layout for an ASIC, for example. Still further, the description of a physical implementation may be in EDIF netlisting language, structural VHDL, structural Verilog or the like. Numerous other possibilities exist. Those skilled in the art will appreciate that the system can also be implemented as a combination of hardware and software modules.

Overview

Figure 2:
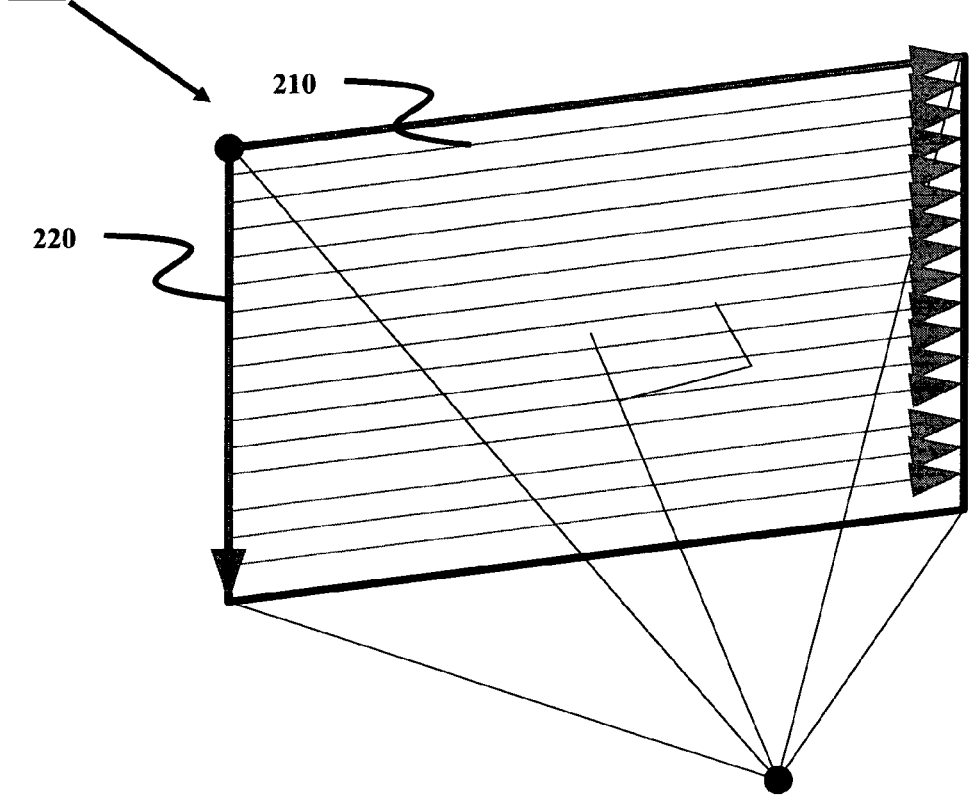
FIG. 2 is a diagram graphically depicting a process of ray-casting a perspective view using additions in accordance with the embodiment of the invention.

A set of DDA vectors can be produced ready for raycasting into the coarse grid—one for each sample (e.g., 1, 2, or 4 samples per pixel for a screen). Processing starts with the vector from P to T. By incrementing the DDA variables along H for horizontal moves (next pixel) or along V for vertical moves (next scanline) using first and second order differentials as indicated in FIG. 2, only additions need be incurred per raycast. This is done using a DDA, preferably set up as described hereinafter.

The embodiments of the invention may be implemented utilizing a 3D-DDA as disclosed by Amanatides, John, and Woo, Andrew, "A fast voxel traversal algorithm for ray tracing," Eurographics '87, 1987, or in U.S. patent application Ser. No. 10/779,384 filed Feb. 13, 2004 entitled "A Method of Setting Up Multi-Dimensional DDA Variables", which is commonly assigned and incorporated by reference herein in its entirety. Other DDA or 3D-DDA algorithms may be practiced without departing from the scope and spirit of the invention.

Figure 3:
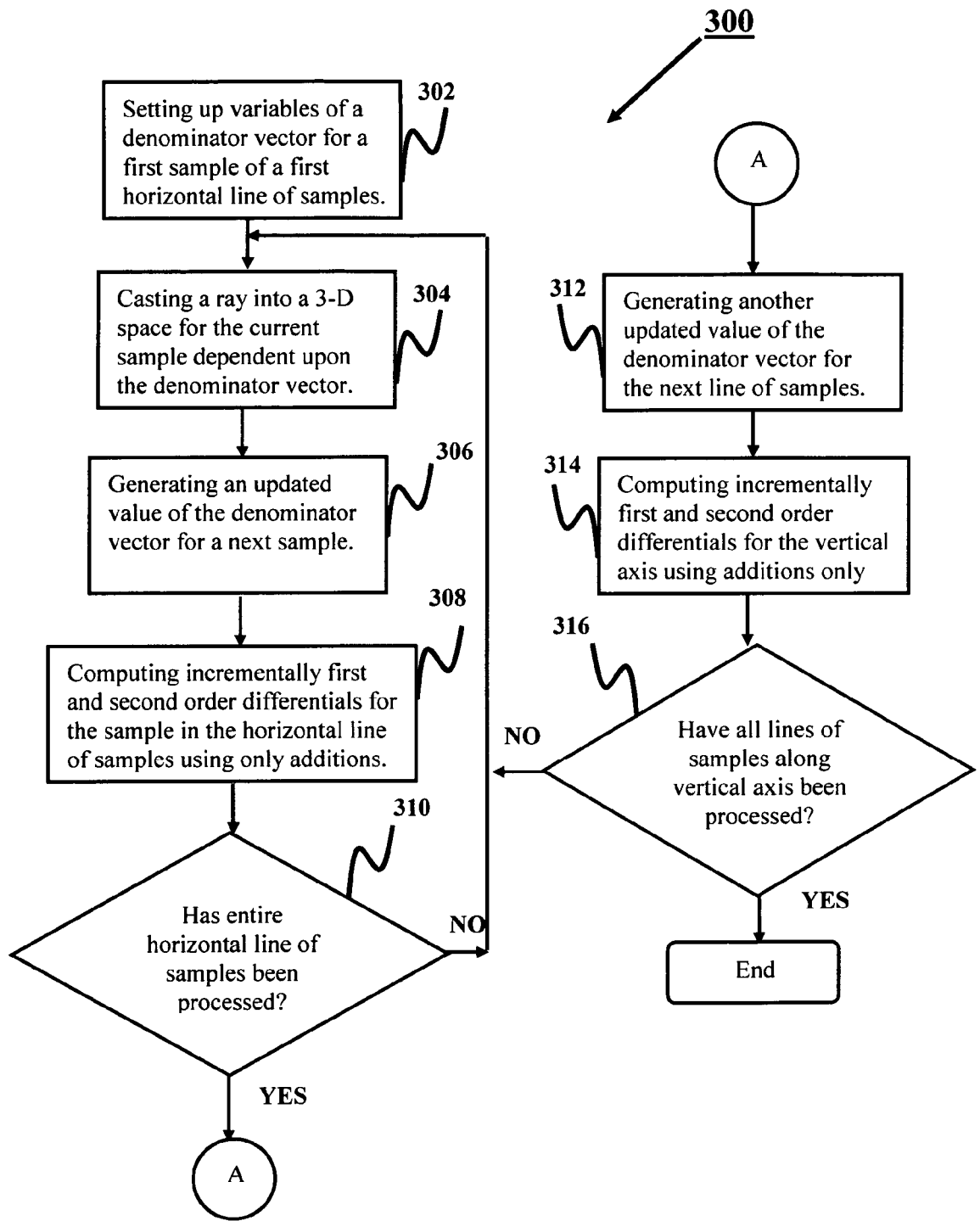
FIG. 3 is a high-level flow diagram of the process of ray-casting a perspective view using additions in accordance with the embodiment of the invention.

FIG. 3 is a high-level flow diagram of the process 300 of ray-casting a perspective view using additions in accordance with the embodiment of the invention. In this process 300, a digital image can be rendered using raytracing in a three-dimensional (3-D) space. A 3-D digital differential analyser (DDA) numerator vector holds the progress within a cell, and a 3-D DDA denominator vector describes a size condition for stepping to a next cell. In step 302, variables of the denominator vector are setup for a first sample of a first horizontal line of samples. A sample and a horizontal line of samples may correspond to a pixel and a horizontal scanline for a rasterised image or screen. Further, for high quality images, more samples per pixel may be taken. For example, super sampling of 4 samples per pixel may be taken and an average sample generated from the four samples. Still further, jittering may be applied to a sample. In step 304, a ray is cast into the 3-D space for a current sample dependent upon the denominator vector. In step 306, an updated value of the denominator vector for a next sample is generated. In step 308, first and second order differentials for the sample in the horizontal line of samples are incrementally computed using only additions. In decision step 310, a check is made to determine if the entire horizontal line of samples has been processed. If step 310 returns false (NO), processing continues at step 304. In this manner, steps 304, 306, and 308 are repeatedly carried out steps until raycasting for the entire horizontal line of samples is completed. That is, a ray is cast for each sample in the horizontal line of samples. If step 310 returns true (YES), processing continues in step 312.

In step 312, another updated value of the denominator vector for a next horizontal line of samples is generated. In step 314, first and second order differentials for the vertical axis are incrementally computed using only additions. In decision step 316, a check is made to determine if all horizontal lines of samples along the vertical axis have been processed. If step 316 returns false (NO), processing continues at step 304. In this manner, steps 304–314 are repeatedly carried out until raycasting for the entire vertical axis is completed. That is, every horizontal line of samples is processed. Otherwise, if step 316 returns true (YES), processing terminates. These and other aspects are set forth in greater detail below.

This approach advantageously limits the cost per ray to additions, instead of a set of multiplications and/or divisions per sample. This allows the raycasting to reach vastly improved performance for a software implementation and a strongly reduced gate count/simplified pipeline for ray setup in hardware implementations.

Fast spatial subdivision structures include the octree, grid and nested-grids. The embodiments of the invention are discussed using grids, however, those skilled in the art will appreciate the DDA nature of the embodiments of the invention leads it to extend equally well into octrees and nested-grids. For purposes of brevity only, the description refers to grids.

Setting Up Variables of Multi-Dimensional DDA Algorithm

Optionally, the DDA variables (numerators and denominators) can be setup without the conventional use of a division operator, removing operators in the 2D case and replacing the operators with a multiplication in the 3D case. In software, this results in a direct improvement in speed and in hardware yields a reduced gate count and a reduced need for pipelining due to reduced gate-depth/operation.

The setup for a DDA typically involves, for each axis, maintaining a "numerator" holding the progress within the cell along that axis and a "denominator" describing the size condition that causes the DDA algorithm to step to the "next" cell. Given a two-dimensional vector, V(A,B), the typical initialization for the denominators is: Denominator (V)=(C/A, C/B), where C is an arbitrary constant (often 1 in floating point implementations). The use of this denominator function involves divisions.

By noting that "C/A" by itself is irrelevant, but the ratio between C/A and C/B is relevant (for purposes of the DDA algorithms execution), the need for division can be removed by:

$$C/A::C/B => (C/A::C/B)*B => B*C/A::B*C/B => B*C/A::C$$

$$B*C/A::C => (B*C/A::C)*A => A*B*C/A::A*C => B*C::A*C$$

$$B*C::A*C => (B*C::A*C)/C => B::A \quad (1)$$

In other words, the denominator variables can be initialized by taking the multiplications of all the other axes participating in the vector. Thus, for vector V(A,B), Denominator(V)=(B, A).

For any multi-dimensional vector, the DDA denominators can be setup as follows:

Denominator(V) for any axis Q=Multiplication of all vector components, excluding the component of axis Q. (2)

In other words, in the 2D case:

Denominator(V) for X=Multiplication of Y with nothing; =>just Y component itself.

In the 3D case:

Denominator(V) for X=Multiplication of Y with Z.

In the 4D case:

Denominator(V) for X=Multiplication of Y with Z and W, and so on.

The foregoing expressions show the case where the X axis is involved. It will be apparent to those skilled in the art in the light of this disclosure that the same is readily modifiable for the Y axis, and other axes, the details of which are not repeated here to avoid a repetitive description. The shortened representation of Denominator(V) for X is DenX or DX as used hereinafter. Similarly, Denominator(V) for Y is DenY or DY, and so on as appropriate.

For all axes Q, the DDA denominators can be setup in the manner of Equation (2) where the denominator (DenQ) for the vector V for any axis Q is equal to the multiplication of the deltas (e.g., x-delta, y-delta, . . . ) of all vector components, excluding the component of axis Q. 'Delta' is the absolute value of a vector's coordinate, e.g., the x-delta of a vector is the absolute x-coordinate (e.g. made positive if negative). The expressions x-delta, y-delta, . . . , have this meaning throughout this disclosure.

Further details of this setup technique are disclosed in U.S. patent application Ser. No. 10/779,384 filed Feb. 13, 2004 entitled "A Method of Setting Up Multi-Dimensional DDA Variables", which is commonly assigned and incorporated by reference herein in its entirety.

The foregoing is a preferred method of setting up DDA variables, but other techniques known to those skilled in the art may be practiced without departing from the scope and spirit of the invention.

Ray-Casting Perspective Views

The following calculations assume that P is at the root of the coordinate space (0,0,0), though this extends to generic cases by pre-translating P and the others to root. For setting up 3D ray T, the DDA denominator D is:

$$D = \begin{pmatrix} Ty \cdot Tz \\ Tx \cdot Tz \\ Tx \cdot Ty \end{pmatrix}, \quad (3)$$

where Tx, Ty, and Tz are the X, Y, and Z axis components of the vector T, setup in the manner described above using Equation (2).

Because the divisions have been removed in the DDA setup, any equations on a linear change in T remain bicubic, as a result of which the differentials remain linear. For a perspective-view frustrum, the change in vector T is an incremental linear stepping across the X axis and therefore does indeed remain bicubic for each horizontal line. By taking the second order differential and using that to step both first and using that in turn to step the denominator, any multiplications and divisions are removed.

The first-order pseudo differential for the first sample of the horizontal line of samples is:

$$hD = \begin{pmatrix} Ty \cdot Hz + Hy \cdot Tz + Hy \cdot Hz \\ Tx \cdot Hz + Hx \cdot Tz + Hx \cdot Hz \\ Tx \cdot Hy + Hx \cdot Ty + Hx \cdot Hy \end{pmatrix} \quad (4)$$

where H is a vector along the horizontal line of samples, from one sample to the next horizontal sample.

The first-order pseudo differential for the first sample of the first line of samples is:

$$vD = \begin{pmatrix} Ty \cdot Vz + Vy \cdot Tz + Vy \cdot Vz \\ Tx \cdot Vz + Vx \cdot Tz + Vx \cdot Vz \\ Tx \cdot Vy + Vx \cdot Ty + Vx \cdot Vy \end{pmatrix} \quad (5)$$

where V is the vector along the vertical screen. A pseudo differential defines the equations ability to be used in a step-wise integration yielding the original equation.

The second-order differential for the horizontal line of samples is:

$$hhD = \begin{pmatrix} 2 \cdot Hy \cdot Hz \\ 2 \cdot Hx \cdot Hz \\ 2 \cdot Hx \cdot Hy \end{pmatrix}. \quad (6)$$

Thus, the second-order differential remains constant throughout.

The second-order differential for the vertical axis is:

$$vvD = \begin{pmatrix} 2 \cdot Vy \cdot Vz \\ 2 \cdot Vx \cdot Vz \\ 2 \cdot Vx \cdot Vy \end{pmatrix}. \quad (7)$$

The differential of the horizontal differential across vertical lines of samples (only for the first sample of first horizontal line of samples) is:

$$vhD = \begin{pmatrix} Hy \cdot Vz + Vy \cdot Hz \\ Hx \cdot Vz + Vx \cdot Hz \\ Hx \cdot Vy + Vx \cdot Hy \end{pmatrix}. \quad (8)$$

Fract( ) is a function that returns the fractional part of a floating point number, e.g., Fract(2.3)=0.3. For negative numbers, this function returns the fraction as measured from the next lower negative number, e.g., Fract(−2.3)=0.7.

The following vectors are used to fraction-scale other vectors:

$$PP = \begin{pmatrix} 1 - Fract(Px) \\ 1 - Fract(Py) \\ 1 - Fract(Pz) \end{pmatrix}. \quad (9)$$

$$PN = \begin{pmatrix} Fract(Px) \\ Fract(Py) \\ Fract(Pz) \end{pmatrix}. \quad (10)$$

The fraction-scaled equivalents of the iteration vectors are initialized as follows:

$$DP = D \cdot PP, \quad (11)$$

$$DN = D \cdot PN, \quad (12)$$

$$hDP = hD \cdot PP, \quad (13)$$

$$hDN = hD \cdot PN, \quad (14)$$

$$hhDP = hhD \cdot PP, \quad (15)$$

$$hhDN = hhD \cdot PN, \quad (16)$$

$$vDP = vD \cdot PP, \quad (17)$$

$$vDN = vD \cdot PN, \quad (18)$$

$$vvDP = vvD \cdot PP, \quad (19)$$

$$vvDN = vvD \cdot PN, \quad (20)$$

$$vhDP = vhD \cdot PP, \text{ and} \quad (21)$$

$$vhDN = vhD \cdot PN. \quad (22)$$

The remaining algorithm is explained by the pseudocode in Table 2.

TABLE 2

```
for all y, 0 to vert-res
    Let vector RDP be DP
    Let vector RDN be DN
    Let vector RhDP be hDP
    Let vector RhDN be hDN
    Let vector S be R
    for all x, 0 to horiz-res
        Cast-ray using:
            as denominator: vector (RDP+RDN)
            as numerator: vector "N" whereby,
            for each axis Q:
                if S(Q) < 0 then
                    N.Q = RDN.Q
                else
                    N.Q = RDP.Q
                end if
            as intersection vector: S
            as origin coordinates:
                for each axis Q
                    Origin.Q = Trunc(P.Q)
        S = S + Hstep
        RDP = RDP + RhDP
        RDN = RDN + RhDN
        RhDP = RhDP + hhDP
        RhDN = RhDN + hhDN
    end for
    DP = DP + vDP
    DN = DN + vDN
    vDP = vDP + vvDP
    vDN = vDN + vvDN
    hDP = hDP + vhDP
```

TABLE 2-continued

```
    hDN = hDN + vhDN
    R = R + Vstep
end for
```

Regarding the pseudocode of Table 2, processing is carried out iteratively for each scanline for the entire screen. The terms Hstep, Vstep, horiz-res, and vert-res have the same meanings given above with respect to Table 1. The vectors RDP and RDN are initialised to DP and DN. Also, the vectors RhDP and RhDN are initialised to hDP and hDN. These computations are carried out once, when the outer for loop is first entered, and then are updated iteratively, as described below. For example, DP is calculated once initially using the formula shown before Table 2 where DP=D.PP. The vector S is set equal to R. For the each scanline from 0 to horiz-res, the cast ray process is carried out. The DDA denominator vector is equal to the vector (RDP+RDN). This is a new value of the denominator vector. The DDA numerator vector is given by vector "N", and if S(Q) is less than 0, then N.Q=RDN.Q and otherwise N.Q=RDP.Q. In the foregoing manner, a value of the numerator is determined for each axis Q dependent on the corresponding denominator (RDN or RDP).

The intersection vector S is the direction of the ray about to be cast in 3-D coordinates (e.g., x, y, and z coordinates). The direction of vector S is needed during a raycast to perform intersection testing with triangles/primitives. The Origin vector as noted above is the viewpoint P. The origin coordinates are, for each axis Q, Origin.Q=Trunc(P.Q), where Trunc( ) is a function that truncates a floating point number into its lower integer, e.g. Trunc(2.3)=2. For negative numbers, Trunc() returns the next lower integer, e.g., Trunc(−2.3)=−3. Following this operation, Origin effectively points to the "starting cell/voxel" for the ray about to be cast. As such, Origin is the origin of the ray about to be cast, having a direction S noted above. The vector S is then incremented by Hstep.

A new value of RDP is computed as the current value of RDP plus the fraction-scaled, first order differential RhDP, and a new value of RDN is computed as the current value of RDN plus the fraction-scaled, first order differential RhDN. Further, a new value of RhDP is computed as the current value of RhDP plus the fraction-scaled, second order differential for the horizontal line of samples hhDP, and a new value of RhDN is computed as the current value of RhDN plus the fraction-scaled, second order differential hhDN. The foregoing computations are carried out using additions and are carried out incrementally for each horizontal line of samples. Consequently, only additions are incurred horizontally, as well as vertically.

Once the current horizontal line of samples is entirely processed within the inner for-loop, new values of DP and DN are computed using additions only to account for vertical changes. In particular, the new value of DP is computed as the current value of DP plus the fraction-scaled, first order differential vDP, and the new value of DN is computed as the current value of DN plus the fraction-scaled, first order differential vDN. vDP and vDN are initialized only for the first sample of the first horizontal line of samples. Following that, vDP and vDN are incremented in the outer for-loop, using the equations vDP=vDP+vvDP and vDN=vDN+vvDN, explained hereinafter. Since the values of vDP and vDN are changed, the order of the equations is important (e.g., DP=DP+vDP is executed before vDP=vDP+vvDP). A new value of vDP is computed as the current value of vDP plus the fraction-scaled, second order differential for the vertical axis vvDP, and a new value of vDN is computed as the current value of vDN plus the fraction-scaled, second order differential vvDN. The foregoing computations are carried out using additions and are carried out incrementally for each horizontal line of samples along the vertical axis. Still further, a new value of hDP is computed as the current value of hDP plus the fraction-scaled vhDP, and a new value of hDN is computed as the current value of hDN plus the fraction-scaled vhDN. The vector to be cast R is incremented by Vstep. Processing continues until the outer for loop is completed.

Again, more than one sample may be taken per pixel. Further, a sample may correspond to a pixel and the horizontal line of samples may be correspond to a horizontal scanline.

Advantageously, only additions are required to raycast each sample. Multiplications and divisions are not required.

In accordance with embodiments of the invention, software implementations therefore benefit in less cycles to execute. Hardware implementations can easily do this with a far reduced number of logic gates.

Computer Implementation

Figure 1:
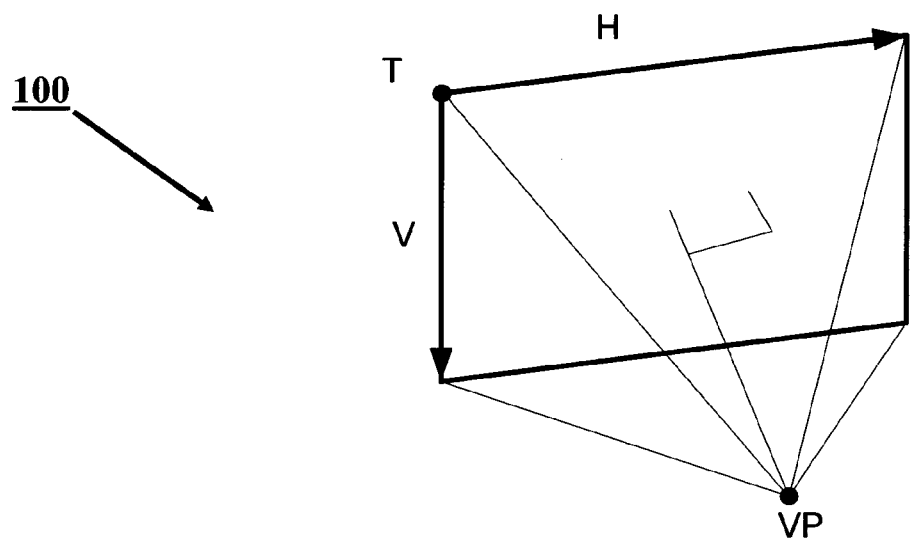
FIG. 1 is a diagram illustrating raycasting in a viewport.
Figure 4:
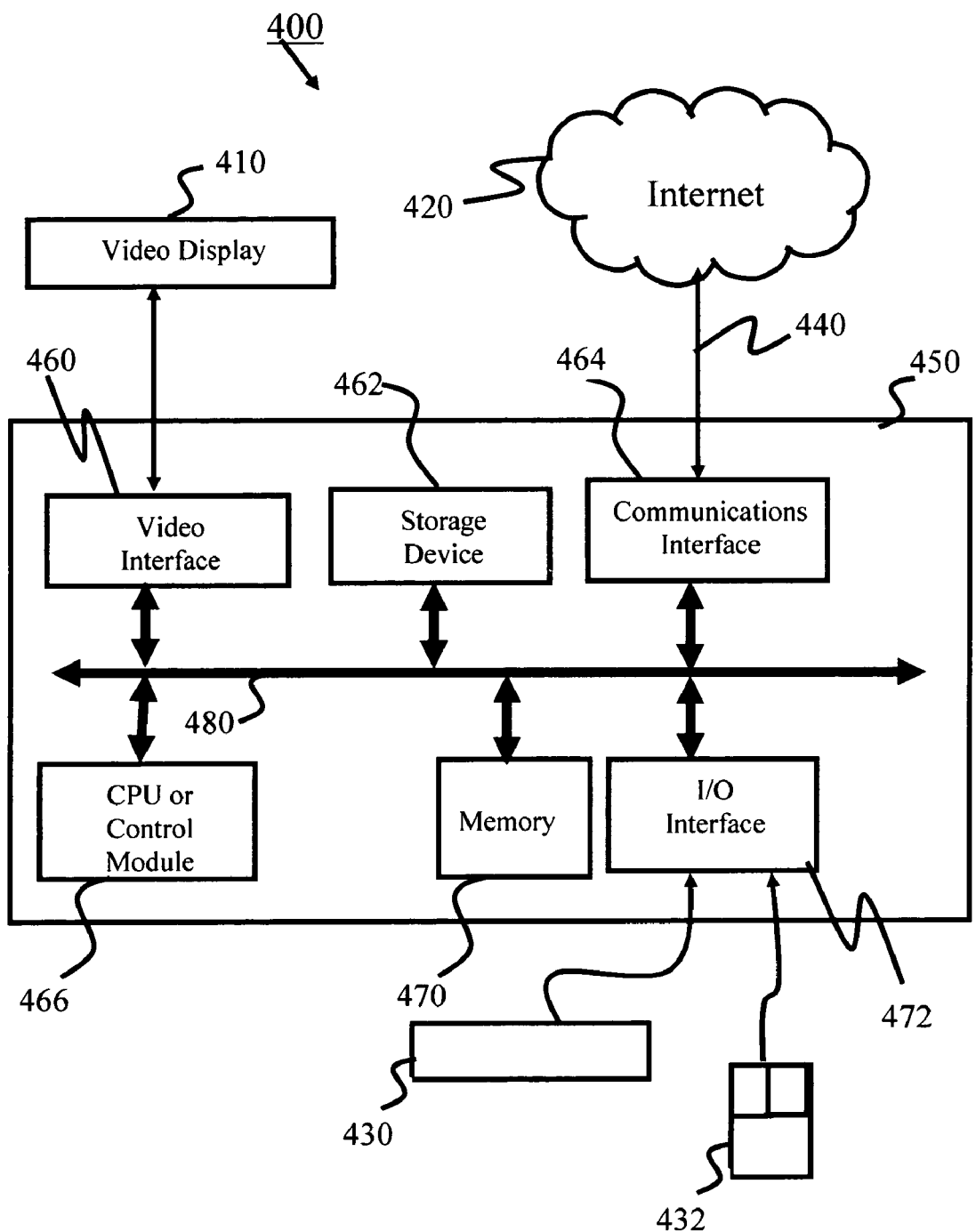
FIG. 4 is a block diagram of a general purpose computer system with which embodiments of the invention may be practiced.

The embodiments of the invention are preferably implemented using a computer. In particular, the processing or functionality described above and depicted in FIGS. 1–3 can be implemented as software, or a computer program, executing on the computer. The method or process steps disclosed for ray-casting perspective views are effected by instructions in the software that are carried out by the computer. The software may be implemented as one or more modules for implementing the process steps. A module is a part of a computer program that usually performs a particular function or related functions. Also, a module can also be a packaged functional hardware unit for use with other components or modules. An example of a computer system 400 with which the embodiments of the invention may be practiced is depicted in FIG. 4.

In particular, the software may be stored in a computer readable medium, including the storage devices described hereinafter. The software is preferably loaded into the computer from the computer readable medium and then carried out by the computer. A computer program product includes a computer readable medium having such software or a computer program recorded on the medium that can be carried out by a computer. The use of the computer program product in the computer preferably effects an advantageous apparatus for ray-casting perspective views in accordance with the embodiments of the invention.

The computer system 400 may include a computer 450, a video display 410, and input devices 430, 432. For example, an operator can use a keyboard 430 and/or a pointing device such as the mouse 432 to provide input to the computer as the input devices. In addition, the computer system can have any of a number of other output devices including line printers, laser printers, plotters, and other reproduction devices connected to the computer. The computer system 400 can be connected to one or more other computers via a communication interface 464 using an appropriate communication channel 440 such as a modem communications path, a computer network, or the like. The computer network may include a local area network (LAN), a wide area network (WAN), an Intranet, and/or the Internet 420.

The computer 450 may include a central processing unit(s) 466 (simply referred to as a processor hereinafter), a memory 470 which may include random access memory (RAM) and read-only memory (ROM), input/output (IO) interfaces 472, a video interface 460, and one or more storage devices 462. The storage device(s) 462 may include one or more of the following: a floppy disc, a hard disc drive, a magneto-optical disc drive, CD-ROM, DVD, magnetic tape or any other of a number of non-volatile storage devices well known to those skilled in the art. Each of the components of the computer 450 is typically connected to one or more of the other devices via a bus 480 that in turn can consist of data, address, and control buses. While a system using a processor has been described, it will be appreciate by those skilled in the art that other processing units capable of processing data and carrying out operations may be used instead without departing from the scope and spirit of the invention.

The computer system 400 is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing are merely examples of the types of computers with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely an example of relevant computer readable mediums. Other computer readable mediums may be practiced without departing from the scope and spirit of the invention.

In the foregoing manner, a method, an apparatus, and a computer program product for ray-casting perspective views are described. While only a small number of embodiments are described, it will be apparent to those skilled in the art in view of this disclosure that numerous changes and/or substitutions can be made without departing from the scope and spirit of the invention.

What is claimed is:

1. A method of rendering a digital image using raytracing in a three-dimensional (3-D) space, a 3-D digital differential analyser (DDA) numerator vector holding the progress within a cell and a 3-D DDA denominator vector describing a size condition for stepping to a next cell, said method comprising the steps of:

setting up a denominator vector for a first sample of a first horizontal line of samples;

(a) casting a ray into said 3-D space for a current sample of said horizontal line of samples dependent upon said denominator vector;

(b) generating an updated value of said denominator vector for a next sample of said horizontal line of samples;

(c) incrementally computing first and second order differential vectors for said sample in said horizontal line of samples using only additions; and (d) repeatedly carrying out steps (a) to (c) until raycasting for said entire horizontal line of samples is completed;

(e) generating another updated value of said denominator vector for a next line of samples;

(f) incrementally computing first and second order differential vectors for said vertical axis using only additions; and (g) repeatedly carrying out steps (a) to (f) until raycasting for said entire vertical axis is completed.

2. The method according to claim 1, wherein said casting step (a) is implemented by a 3-D digital differential analyzer (DDA).

3. The method according to claim 1, wherein said setting-up step comprises initializing parameters for said first sample, said parameters including first and second order differential vectors for said first sample.

4. The method according to claim 3, wherein said denominator vector is:

$$D = \begin{pmatrix} Ty \cdot Tz \\ Tx \cdot Tz \\ Tx \cdot Ty \end{pmatrix},$$

where Tx, Ty, and Tz are the X, Y, and Z axis components of a vector T.

5. The method according to claim 4, wherein: a first-order pseudo differential vector for said first sample of a first horizontal line of samples is:

$$hD = \begin{pmatrix} Ty \cdot Hz + Hy \cdot Tz + Hy \cdot Hz \\ Tx \cdot Hz + Hx \cdot Tz + Hx \cdot Hz \\ Tx \cdot Hy + Hx \cdot Ty + Hx \cdot Hy \end{pmatrix},$$

H being a vector along said horizontal line of samples, from one sample to the next sample; said second-order differential vector for said horizontal line of samples is:

$$hhD = \begin{pmatrix} 2 \cdot Hy \cdot Hz \\ 2 \cdot Hx \cdot Hz \\ 2 \cdot Hx \cdot Hy \end{pmatrix};$$

said first-order pseudo differential vector for a first sample of a first line of samples is:

$$vD = \begin{pmatrix} Ty \cdot Vz + Vy \cdot Tz + Vy \cdot Vz \\ Tx \cdot Vz + Vx \cdot Tz + Vx \cdot Vz \\ Tx \cdot Vy + Vx \cdot Ty + Vx \cdot Vy \end{pmatrix},$$

V being a vector along a vertical screen; said second-order differential vector for said vertical axis is:

$$vvD = \begin{pmatrix} 2 \cdot Vy \cdot Vz \\ 2 \cdot Vx \cdot Vz \\ 2 \cdot Vx \cdot Vy \end{pmatrix}; \text{ and}$$

a differential vector of a horizontal differential across vertical line of samples is:

$$vhD = \begin{pmatrix} Hy \cdot Vz + Vy \cdot Hz \\ Hx \cdot Vz + Vx \cdot Hz \\ Hx \cdot Vy + Vx \cdot Hy \end{pmatrix}.$$

6. The method according to claim 1, further comprising the step of fraction-scaling said differential vectors.

7. The method according to claim 1, wherein said generating step (b) comprises: summing a current value of said denominator vector and said first order differential vector for said current sample in said horizontal line of samples to provide said updated value of said denominator vector for said next sample; and summing a current value of said first order differential vector and said second order differential vector for said current sample in said horizontal line of samples to provide an updated value of said first order differential vector.

8. The method according to claim 1, further comprising the step of computing a direction for the next ray for casting dependent upon a current direction of said ray and dependent upon a horizontal resolution of said horizontal line of samples.

9. The method according to claim 1, wherein said generating step (e) comprises: summing a current value of said denominator vector and said first order differential vector for said current sample for said vertical axis to provide said updated value of said denominator vector for a first sample of said next line of samples; and summing a current value of said first order differential vector and said second order differential vector for said current sample for said vertical axis to provide an updated value of said first order differential vector.

10. The method according to claim 9, wherein said generating step (e) further comprises: summing a current value of said first order differential vector for said current sample in said horizontal line of samples and a differential vector of said horizontal differential across vertical line of samples to provide an updated value of said first order differential vector for said current sample in said horizontal line of samples.

11. The method according to claim 1, further comprising the step of computing a direction for the next ray for casting dependent upon a current direction of said ray and dependent upon a vertical resolution of said vertical screen.

12. An apparatus for rendering a digital image using raytracing in a three-dimensional (3-D) space, a 3-D digital differential analyser (DDA) numerator vector holding the progress within a cell and a 3-D DDA denominator vector describing a size condition for stepping to a next cell, said apparatus comprising: a memory storing information for rendering said digital image; and a processing unit coupled to said memory for rendering said digital image, said processing unit performing the following operations: setting up a denominator vector for a first sample of a first horizontal line of samples;

(a) casting a ray into said 3-D space for a current sample of said horizontal line of samples dependent upon said denominator vector;
(b) generating an updated value of said denominator vector for a next sample of said horizontal line of samples;
(c) incrementally computing first and second order differential vectors for said sample in said horizontal line of samples using only additions;
(d) repeatedly carrying out operations (a) to (c) until raycasting for said entire horizontal line of samples is completed;
(e) generating another updated value of said denominator vector for a next line of samples;
(f) incrementally computing first and second order differential vectors for said vertical axis using only additions; and
(g) repeatedly carrying out operations (a) to (f) until raycasting for said entire vertical axis is completed.

13. The apparatus according to claim 12, wherein said casting operation (a) is implemented by a 3-D digital differential analyzer (DDA).

14. The apparatus according to claim 12, wherein said setting-up operation comprises initializing parameters for said first sample, said parameters including first and second order differential vectors for said first sample.

15. The apparatus according to claim 14, wherein said denominator vector is:

$$D = \begin{pmatrix} Ty \cdot Tz \\ Tx \cdot Tz \\ Tx \cdot Ty \end{pmatrix},$$

where Tx, Ty, and Tz are the X, Y, and Z axis components of a vector T.

16. The apparatus according to claim 15, wherein: a pseudo first-order differential vector for said first sample of a first horizontal line of samples is:

$$hD = \begin{pmatrix} Ty \cdot Hz + Hy \cdot Tz + Hy \cdot Hz \\ Tx \cdot Hz + Hx \cdot Tz + Hx \cdot Hz \\ Tx \cdot Hy + Hx \cdot Ty + Hx \cdot Hy \end{pmatrix},$$

H being a vector along said horizontal line of samples, from one sample to the next sample; said second-order differential vector for said horizontal line of samples is:

$$hhD = \begin{pmatrix} 2 \cdot Hy \cdot Hz \\ 2 \cdot Hx \cdot Hz \\ 2 \cdot Hx \cdot Hy \end{pmatrix};$$

said first-order pseudo differential vector for a first sample of a first line of samples is:

$$vD = \begin{pmatrix} Ty \cdot Vz + Vy \cdot Tz + Vy \cdot Vz \\ Tx \cdot Vz + Vx \cdot Tz + Vx \cdot Vz \\ Tx \cdot Vy + Vx \cdot Ty + Vx \cdot Vy \end{pmatrix},$$

V being a vector along a vertical screen; said second-order differential vector for said vertical axis is:

$$vvD = \begin{pmatrix} 2 \cdot Vy \cdot Vz \\ 2 \cdot Vx \cdot Vz \\ 2 \cdot Vx \cdot Vy \end{pmatrix}; \text{ and}$$

a differential vector of a horizontal differential across vertical line of samples is:

$$vhD = \begin{pmatrix} Hy \cdot Vz + Vy \cdot Hz \\ Hx \cdot Vz + Vx \cdot Hz \\ Hx \cdot Vy + Vx \cdot Hy \end{pmatrix}.$$

17. The apparatus according to claim 12, further comprising the operation of fraction-scaling said differential vectors.

18. The apparatus according to claim 12, wherein said generating operation (b) comprises: summing a current value of said denominator vector and said first order differential vector for said current sample in said horizontal line of samples to provide said updated value of said denominator vector for said next sample; and summing a current value of said first order differential vector and said second order differential vector for said current sample in said horizontal line of samples to provide an updated value of said first order differential vector.

19. The apparatus according to claim 12, further comprising the operation of computing a direction for the next ray for casting dependent upon a current direction of said ray and dependent upon a horizontal resolution of said horizontal line of samples.

20. The apparatus according to claim 12, wherein said generating operation (e) comprises: summing a current value of said denominator vector and said first order differential vector for said current sample for said vertical axis to provide said updated value of said denominator vector for a first sample of said next line of samples; and summing a current value of said first order differential vector and said second order differential vector for said current sample for said vertical axis to provide an updated value of said first order differential vector.

21. The apparatus according to claim 20, wherein said generating operation (e) further comprises: summing a current value of said first order differential vector for said current sample in said horizontal line of samples and a differential vector of said horizontal differential across vertical line of samples to provide an updated value of said first order pseudo differential vector for said current sample in said horizontal line of samples.

22. The apparatus according to claim 12, further comprising the operation of computing a direction for the next ray for casting dependent upon a current direction of said ray and dependent upon a vertical resolution of said vertical screen.

23. The apparatus according to claim 12, wherein said processing unit is a processor programmed to perform said operations.

24. A computer program product having a computer readable medium with a computer program recorded therein for rendering a digital image using raytracing in a three-dimensional (3-D) space, a 3-D digital differential analyser (DDA) numerator vector holding the progress within a cell and a 3-D DDA denominator vector describing a size condition for stepping to a next cell, said computer program product comprising:

computer program code means for setting up a denominator vector for a first sample of a first horizontal line of samples;

(a) computer program code means for casting a ray into said 3-D space for a current sample of said horizontal line of samples dependent upon said denominator vector;

(b) computer program code means for generating an updated value of said denominator vector for a next sample of said horizontal line of samples;

(c) computer program code means for incrementally computing first and second order differential vectors for said sample in said horizontal line of samples using only additions; and (d) computer program code means for repeatedly carrying out operation of said computer program code means (a) to (c) until raycasting for said entire horizontal line of samples is completed;

(e) computer program code means for generating another updated value of said denominator vector for a next line of samples;

(f) computer program code means for incrementally computing first and second order differential vectors for said vertical axis using only additions; and (g) repeatedly carrying out operation of said computer program code means for (a) to (f) until raycasting for said entire vertical axis is completed.

25. The computer program product according to claim 24, wherein said computer program code means for casting (a) is implemented by a 3-D digital differential analyzer (DDA).

26. The computer program product according to claim 24, wherein said computer program code means for setting-up comprises computer program code means for initializing parameters for said first sample, said parameters including first order differentials and second order differential vectors for said first sample.

27. The computer program product according to claim 26, wherein said denominator vector is:

$$D = \begin{pmatrix} Ty \cdot Tz \\ Tx \cdot Tz \\ Tx \cdot Ty \end{pmatrix},$$

where Tx, Ty, and Tz are the X, Y, and Z axis components of a vector T.

28. The computer program product according to claim 27, wherein: a first-order pseudo differential vector for said first sample of a first horizontal line of samples is:

$$hD = \begin{pmatrix} Ty \cdot Hz + Hy \cdot Tz + Hy \cdot Hz \\ Tx \cdot Hz + Hx \cdot Tz + Hx \cdot Hz \\ Tx \cdot Hy + Hx \cdot Ty + Hx \cdot Hy \end{pmatrix},$$

H being a vector along said horizontal line of samples, from one sample to the next sample; said second-order differential vector for said horizontal line of samples is:

$$hhD = \begin{pmatrix} 2 \cdot Hy \cdot Hz \\ 2 \cdot Hx \cdot Hz \\ 2 \cdot Hx \cdot Hy \end{pmatrix};$$

said first-order pseudo differential vector for a first sample of a first line of samples is:

$$vD = \begin{pmatrix} Ty \cdot Vz + Vy \cdot Tz + Vy \cdot Vz \\ Tx \cdot Vz + Vx \cdot Tz + Vx \cdot Vz \\ Tx \cdot Vy + Vx \cdot Ty + Vx \cdot Vy \end{pmatrix}$$

being a vector along a vertical screen; said second-order differential vector for said vertical axis is:

$$vvD = \begin{pmatrix} 2 \cdot Vy \cdot Vz \\ 2 \cdot Vx \cdot Vz \\ 2 \cdot Vx \cdot Vy \end{pmatrix}; \text{ and}$$

a differential vector of a horizontal differential across vertical line of samples is:

$$vhD = \begin{pmatrix} Hy \cdot Vz + Vy \cdot Hz \\ Hx \cdot Vz + Vx \cdot Hz \\ Hx \cdot Vy + Vx \cdot Hy \end{pmatrix}.$$

29. The computer program product according to claim 24, further comprising computer program code means for fraction-scaling said differential vectors.

30. The computer program product according to claim 24, wherein said computer program code means for generating (b) comprises:

computer program code means for summing a current value of said denominator vector and said first order differential vector for said current sample in said horizontal line of samples to provide said updated value of said denominator vector for said next sample; and computer program code means for summing a current value of said first order differential vector and said second order differential vector for said current sample in said horizontal line of samples to provide an updated value of said first order differential vector.

31. The computer program product according to claim 24, further comprising computer program code means for computing a direction for the next ray for casting dependent upon a current direction of said ray and dependent upon a vertical resolution of said vertical screen.

32. The computer program product according to claim 24, wherein said computer program code means for generating (e) comprises:

computer program code means for summing a current value of said denominator vector and said first order differential vector for said current sample for said vertical axis to provide said updated value of said denominator vector for a first sample of said next line of samples; and computer program code means for summing a current value of said first order differential vector and said second order differential vector for said current sample for said vertical axis to provide an updated value of said first order differential vector.

33. The computer program product according to claim 32, wherein said computer program code means for generating (e) further comprises:

computer program code means for summing a current value of said first order differential vector for said current sample in said horizontal line of samples and a differential vector of said horizontal differential across vertical line of samples to provide an updated value of said first order pseudo differential vector for said current sample in said horizontal line of samples.

34. The computer program product according to claim 24, further comprising computer program code means for computing a direction for the next ray for casting dependent upon a current direction of said ray and dependent upon a vertical resolution of said vertical screen.

* * * * *